April 20, 1937.                H. STEMMAN                    2,078,105
                              ADJUSTABLE HITCH
                             Filed Aug. 6, 1935
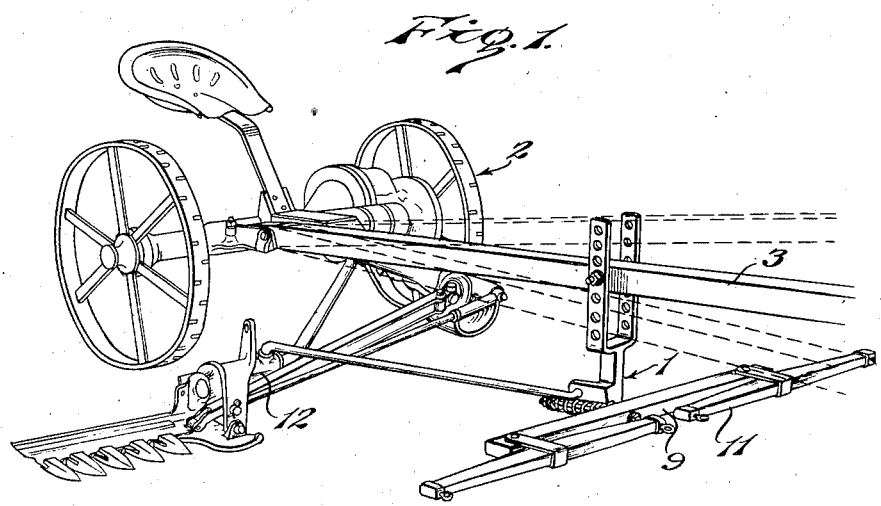
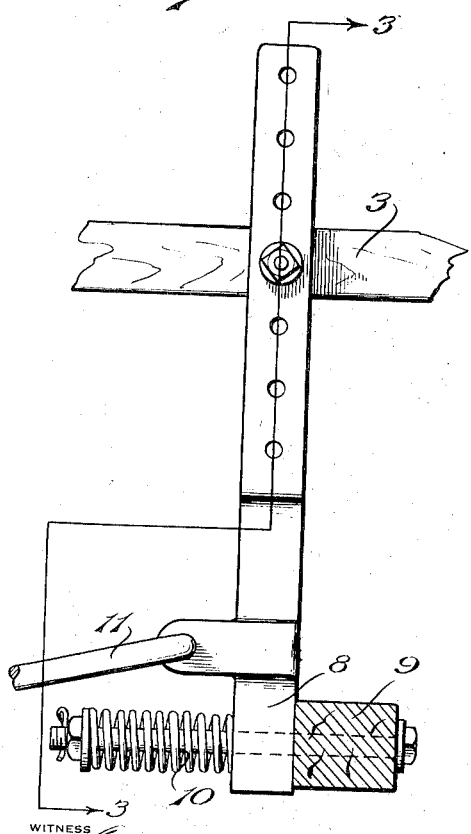
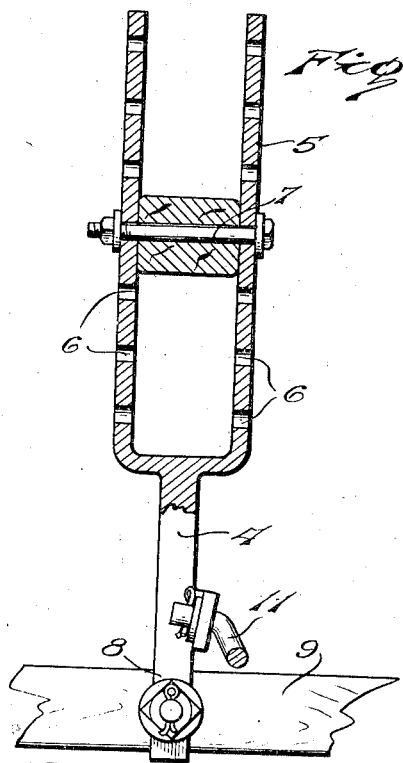
Herman Stemman
INVENTOR
BY Victor J. Evans & Co.
ATTORNEY

UNITED STATES PATENT OFFICE

2,078,105

ADJUSTABLE HITCH

Herman Stemman, Stevensville, Mont.

Application August 6, 1935, Serial No. 34,987

1 Claim. (Cl. 278—95)

This invention relates to an adjustable draft hitch especially adapted for mowers and similar farming implements wherein draft animals are subjected to loads on the necks thereof which frequently develop sore necks or injury to the necks of the draft animals to such an extent that their usefulness is impaired, and has for the primary object the provision of a device of this character which will relieve neck loads on the animal by maintaining the farm implements balanced on the ground wheels while being pulled and which is readily adjustable to adapt to draft animals of different sizes or heights.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view showing my invention adapted to a mower.

Figure 2 is a fragmentary side elevation, partly in section, illustrating the adjustment of the draft hitch.

Figure 3 is a sectional view taken on the line 3—3 of Figure 2.

Referring in detail to the drawing, the numeral 1 indicates in entirety an adjustable hitch and is shown as adapted to a mower 2 of a conventional construction wherein a draft pole or tongue 3 is employed and is capable of being adjusted upwardly and downwardly with respect to the mower so as to adapt the mower to draft animals of different heights. The hitch 1 is shown as adjustably and pivotally secured to the tongue 3 and also connected to the mower proper so that the draft applied thereto will be directed onto the mower proper whereby the draft will maintain the mower balanced upon its ground wheels, relieving load on the draft animals' necks which are coupled in the usual manner to the pole 3.

The hitch 1 includes a member 4 having a forked portion presenting parallel members 5 each having a series of openings 6. The openings 6 of the members 5 align so that a pole 7 may be passed through said openings and through the tongue 3, whereby the member 4 is pivotally and adjustably connected to the tongue 3. The member 4 depends from the tongue 3 and is formed integrally with a head 8 to which a double tree 9 is connected, as shown at 10. The double tree 9 has connected thereto the single trees 11 to which the draft animals are hitched. The member 4, which is in the nature of a bar, has integrally formed therewith, above its head 8, an arm 50. The arm 50 is directed toward the sickle of the machine and has pivoted thereto, adjacent to its fore end, a connecting rod 11', which is in turn pivoted to the mower proper and, as shown in Figure 1, is connected to the sickle bar head 12 of the mower so that the draft from the single trees will be in substantial horizontal alignment with the cutting mechanism of the mower whereby the mower will be caused to balance upon its ground wheels when being pulled by the draft animals and thereby relieve loads on the necks of the draft animals. The connection 10 of the double tree to the head 8 is of a yieldable construction for the purpose of absorbing load shocks to the draft animals. While my invention has been described and shown as adapted to a mower, it is to be understood that it may be readily applied to any type of farm implement wherein it is desirable to have the farm implement balance itself on the ground wheels for the purpose of relieving loads on the necks of the draft animals caused by the pulling force on the mower proper instead of on the tongue as customarily employed.

Having described the invention, I claim:

In a horse drawn mower having a forwardly extending tongue and a forwardly extending rod connected at one end to the sickle mechanism, means for adjusting the angular relation of said rod relative to said tongue, comprising a U-shaped member having the parallel legs thereof disposed on opposite sides of said tongue, the parallel legs of said member being provided with a plurality of alined openings, a bolt extending through selected pairs of said openings and said tongue, a head integral with and extending downwardly of the bight of said member and provided with an opening adjacent the lower end thereof to receive a double tree attaching means, and a rearwardly extending arm integral with said head and disposed between said member and the opening in said head, said arm having an opening to pivotally receive the forward end of said rod.

HERMAN STEMMAN.